(12) United States Patent
Lambert

(10) Patent No.: US 10,523,936 B2
(45) Date of Patent: Dec. 31, 2019

(54) DATA COMPRESSION

(71) Applicant: DIGITAL BARRIERS SERVICES LTD, Abington, Oxon (GB)

(72) Inventor: Robert Lambert, Renfrewshire (GB)

(73) Assignee: DIGITAL BARRIERS SERVICES LTD, London (GB)

( * ) Notice: Subject to any disclaimer, the term of this patent is extended or adjusted under 35 U.S.C. 154(b) by 73 days.

(21) Appl. No.: 15/768,259

(22) PCT Filed: Sep. 15, 2016

(86) PCT No.: PCT/GB2016/052883
§ 371 (c)(1),
(2) Date: Apr. 13, 2018

(87) PCT Pub. No.: WO2017/064457
PCT Pub. Date: Apr. 20, 2017

(65) Prior Publication Data
US 2018/0324419 A1    Nov. 8, 2018

(30) Foreign Application Priority Data
Oct. 16, 2015    (GB) .................................. 1518290.0

(51) Int. Cl.
*H04N 19/115*    (2014.01)
*H04N 19/176*    (2014.01)
(Continued)

(52) U.S. Cl.
CPC ......... *H04N 19/115* (2014.11); *H04N 19/103* (2014.11); *H04N 19/146* (2014.11);
(Continued)

(58) Field of Classification Search
CPC .. H04N 19/115; H04N 19/192; H04N 19/154; H04N 19/146; H04N 19/176; H04N 19/147; H04N 19/103
(Continued)

(56) References Cited

U.S. PATENT DOCUMENTS

2005/0100229 A1    5/2005    Becker et al.
2007/0153897 A1    7/2007    Yan
(Continued)

FOREIGN PATENT DOCUMENTS

GB    2 306 840    5/1997
WO    WO 97/16026    5/1997
(Continued)

OTHER PUBLICATIONS

International Search Report for PCT/GB2016/052883, dated Nov. 30, 2016, 3 pages.
(Continued)

*Primary Examiner* — Allen C Wong
(74) *Attorney, Agent, or Firm* — Nixon & Vanderhye PC

(57) ABSTRACT

A method of compressing an array of data entries in the form of digital electronic signals, the method including determining a plurality of possible compressed encodings for each block of the array using a respective different compression technique for each encoding of the block, wherein each possible compressed encoding has a respective data size and a respective reconstruction error; and generating a list of the plurality of compressed encodings and selecting that one of the plurality of compressed encodings from the list which, when uncompressed and added to the reference data array, provides the largest relative improvement in reconstruction error per unit increase in data size. A compressed encoding of the original data array may then be updated by adding the selected compressed encoding, and a reference data array
(Continued)

may be updated by adding the selected encoding in uncompressed form. These steps may be different combinations of macro block regions repeated recursively until a maximum data size is achieved for the compressed encoding of the original data array.

15 Claims, 3 Drawing Sheets

(51) Int. Cl.
*H04N 19/147* (2014.01)
*H04N 19/103* (2014.01)
*H04N 19/146* (2014.01)
*H04N 19/154* (2014.01)
*H04N 19/192* (2014.01)

(52) U.S. Cl.
CPC ......... *H04N 19/147* (2014.11); *H04N 19/154* (2014.11); *H04N 19/176* (2014.11); *H04N 19/192* (2014.11)

(58) Field of Classification Search
USPC .................................................... 375/240.02
See application file for complete search history.

(56) References Cited

U.S. PATENT DOCUMENTS

| | | | |
|---|---|---|---|
| 2014/0101485 A1* | 4/2014 | Wegener | H03M 7/3068 714/32 |
| 2015/0256849 A1* | 9/2015 | Kim | G06T 9/00 375/240.16 |

FOREIGN PATENT DOCUMENTS

| | | |
|---|---|---|
| WO | WO 98/34398 | 8/1998 |
| WO | WO 2016/128701 | 8/2016 |

OTHER PUBLICATIONS

Ortega A. et al., "Rate-Distortion Methods for Image and Video Compression", IEEE Signal Processing Magazine, vol. 15, No. 6, Nov. 1, 1998, pp. 23-50.

Tanizawa A. et al., "Fast Rate-Distortion Optimized Coding Mode Decision for H.264," Electronics & Communications in Japan,— Fundamental Electronic Science, part 3, vol. 90, No. 9, Jan. 1, 2007, pp. 41-55.

International Preliminary Report on Patentability dated Apr. 26, 2018 in International Application No. PCT/GB2016/052883, 9 pages.

* cited by examiner

DATA COMPRESSION

This application is the U.S. national phase of International Application No. PCT/GB2016/052883 filed 15 Sep. 2016, which designated the U.S. and claims priority to GB Patent Application No. 1518290.0 filed 16 Oct. 2015, the entire contents of each of which are hereby incorporated by reference.

The invention relates to a method and apparatus for compressing an array of data entries in the form of digital electronic signals.

Digital video is a sequence of visual images or frames that convey the impression of motion when viewed in temporal order. Each frame is coded as an orthogonal bitmap comprised of individual pixels where each row has an equal number of pixels defining the frame width and similarly each column has an equal number of pixels defining the frame height. Each pixel encodes colour where more subtle variations in colour can be represented by increasing the number of bits used to encode each pixel (sometimes referred to as pixel depth). Hence the number of bits required to represent a single video frame is width multiplied by height multiplied by pixel depth.

To provide the impression of motion it is necessary to display these frames in rapid succession at a constant frame rate where frame rate is defined as frames per second (fps). A video frame rate of 24 fps is generally considered the minimum to convey the impression of continuous motion.

The need for video compression can be appreciated when the volume of data required to transmit or store raw digital video is considered. A full colour high definition (1920×1080) video frame with a pixel depth of 16 bits per pixel corresponds to 33 million bits or 4 Mbytes. A 1920×1080 video at 25 frames per second is 99 Mbytes of data every second meaning a one minute high definition video clip requires approximately 5.8 Gbytes of data to transmit or store. This would involve lengthy download times, and may exceed data allowances for many cellular customers.

The compression techniques used for text are lossless where decompression must reproduce exactly the same text. Video compression by contrast exploits spatial and temporal redundancy within and between video frames to significantly reduce the amount of data required to transmit or store video by approximating rather than reproducing the original pixel values. Video compression is hence a lossy compression process where the quality of the decompressed video (how well it approximates the original video) depends on the compression ratio and complexity of the video.

$$\left(\frac{\text{source size}}{\text{compressed size}}\right) : 1$$

Compression ratio is generally expressed as where size is measured in bits. A compression ratio of 100:1 is easily achievable by most video compression algorithms allowing the 1 minute high definition video clip to be compressed down to 59 Mbytes. This compression means that the video clip can be downloaded in minutes rather than hours.

Video is compressed either to minimise storage, reduce transmission costs, or to enable live streaming, and these objectives typically involve different approaches. Compression to minimise storage typically involves setting an acceptable quality threshold for the compression of each frame such that there are few or no visible differences between the source and compressed video. The compressed size of each video frame is irrelevant allowing the video compression process to allocate more bits to those segments of the video that have the most complex spatial detail or rapid motion between frames. Such techniques are sometimes referred to as "variable rate" where the size of the compressed video will depend on the video content.

Where transmission is involved it is normal to target a bandwidth, defined as bits per second, rather than quality. This ensures that the compressed video is of a predictable size and hence bandwidth usage can be controlled. Most compression algorithms employ a rate control that adjusts the target quality on a frame by frame basis such that a target bandwidth is achieved. To hit the target bandwidth the compression algorithm may have to "drop" frames if the quality drops too low. This results in a variable frame rate where frame rate drops as the motion being captured by the video becomes more rapid or complex.

Real-time low latency streaming at a constant frame rate can only be achieved through the use of fixed rate coding. Unlike the previous approaches that compress each video frame to a target quality that may be fixed or variable, fixed rate coding requires that the compression process target the number of bits used to compress each individual frame. This ensures that the compressed size of each frame is matched to the actual capacity of a communications channel where the channel will be able to transmit data up to a defined maximum bandwidth. The trade-off is visual quality which will vary according to the complexity of the video sequence and the amount of scene motion.

One technique for providing fixed rate video coding is described in WO97/16026 whereby each frame can be approximated as a collection of variable sized blocks where the pixels in each block approximate the equivalent source pixel values using an established image coding technique. The algorithm successively adds compressed encodings corresponding to individual blocks until the resultant frame coding reaches the target compressed frame size. In WO97/16026 the algorithm adds new compressed encodings that deliver the greatest improvement in the uncompressed representation of the video frame. In other words, the algorithm adds blocks that offer the lowest reconstruction error, where this is a measure of the difference between the source frame and the frame that would be generated from a decoding of the compressed frame.

One limitation with the approach in WO97/16026 is that the algorithm focuses only on improving the reconstruction error. One difficulty is that the lowest reconstruction error is sometimes achieved by providing encodings with a relatively large data size. Therefore, this compression algorithm may not always make the most efficient use of the available bandwidth.

Another limitation with the approach in WO97/16026 is that smaller blocks can be added in such a way that they partially occlude a previously selected patch. Although this can deliver reduced reconstruction error it can also be problematic because it can lead to sub-optimal approximations.

According to one aspect of the present invention there is provided a method of compressing an array of data entries in the form of digital electronic signals, the method comprising the steps of: (a) providing an original data array to be compressed; (b) determining a plurality of possible compressed encodings of the array, wherein each possible compressed encoding has a respective data size and a respective reconstruction error; (c) initialising a compressed encoding of the original data array which when uncompressed corresponds to a reference data array which is an initial approximation to the original data array, wherein the compressed encoding has a first data size and a first reconstruction error, representing a quantitative difference between the original data array and the reference data array; (d) selecting that one of the plurality of compressed encodings which, when uncompressed and added to the reference data array, provides the largest relative improvement in reconstruction error per unit increase in data size; (e) updating the compressed encoding of the original data array by adding the selected compressed encoding, and updating the reference data array by adding the selected encoding in uncompressed form; and (f) recursively repeating steps (d) and (e) until a maximum data size is achieved for the compressed encoding of the original data array.

In this way an efficient compression technique is provided that balances competing desires for a high quality uncompressed representation of the original data array (i.e. low reconstruction error values) and a low data size for the compressed data array.

This is achieved by iteratively updating the compressed representation by adding compressed encodings that offer the largest relative improvement in reconstruction error per unit increase in data size. This can gradually increase the data size of the compressed representation, and gradually decrease the reconstruction error until a maximum data size is achieved. This technique can permit creation of a compressed representation with an optimal reconstruction error within a specific data size budget.

This technique is particularly useful in the compression of live video over variable bandwidth channels. The technique can permit optimised compression with minimal reconstruction error within the constraints of channel bandwidth. Thus, live video can be transmitted with minimal latency by making best use of the available bandwidth.

Difficulties relating to partial occlusions are also overcome. In the present method a previous patch may be replaced only if it is fully occluded by smaller blocks. This can lead to improved encoding optimisation.

Preferably the original data array is divided into blocks of one or more sizes, and wherein at least one possible compressed encoding is determined for each block. In this way, compressed encodings may be provided for various subdivisions of the original array. A complete compressed representation of the underlying array may be formed by combining compressed encodings for the various sub-divisions. In general, larger sized blocks can be encoded with a smaller data size, but with a larger reconstruction error. Thus, it is advantageous to provide a plurality of tiers of division for the original data array with increasing granularity (i.e. the blocks with reducing size). In this way an effective iteration can be achieved where the reconstruction error is reduced as data size is increased for the compressed representation.

Preferably a plurality of possible compressed encodings is determined for each block using a plurality of compression techniques. The optimal compression technique for a block generally depends on the properties of the data in the block. By providing a plurality of possible compression techniques it is possible to select the most effective technique for compressing the underlying data (i.e. the technique that can compress data with the optimal data size and reconstruction error). For video coding, for example, motion estimation may be used as a compression technique to remove temporally redundant information between video frame sequences. Motion estimation may be an effective compression technique for video frames where there is some movement occurring, such that there are significant similarities between successive frames. In another example, run length coding is effective for video frames which have large numbers of 'zero' data entries, interspersed with non-zero values. By determining compressed encodings using a number of techniques the method has flexibility to select the most efficient compressed encodings (i.e. the compressed encoding which, when uncompressed and added to the reference data array, provides the largest relative improvement in reconstruction error per unit increase in data size).

Non-limiting examples of possible compression techniques for video coding include motion estimation, transform coding, vector quantisation and residual coding.

The plurality of possible compressed encodings of the array preferably comprises a plurality of permutations for different ways that encodings for different areas can be combined. Any valid combination of encodings should preferably cover the full area or all of the elements of the underlying array.

The plurality of possible compressed encodings of the array preferably comprises only those compressed encodings that can be provided in a sequence which has both increasing data size and decreasing reconstruction error. Thus, it is possible to omit any compressed encoding that does not offer a reduced reconstruction error for any increase in data size. In this way it is possible to omit a large number of sub-optimal encodings from the list of possible selections. This can significantly decrease processing time, and facilitate real-time compression. This is particularly useful in live video applications where it is important to minimise any latency.

The method may comprise a step of de-duplicating the plurality of possible compressed encodings of the array to identify compressed encodings that have the same data size, and to omit any of those identified compressed encodings that have a larger reconstruction error. Additionally, the plurality of possible compressed encodings of the array preferably comprises only those compressed encodings that can be provided in a list having a data size that is smaller than the data size of the original array.

According to another aspect of the present invention there is provided a video encoder configured to send video data over a channel, the encoder comprising: a compressor configured to compress video data using an adjustable compression factor, and a transmitter configured to transmit constructed data packets over the channel, wherein the compressor is configured to: (a) receive an original data array to be compressed; (b) determine a plurality of possible compressed encodings of the array, wherein each possible compressed encoding has a respective data size and a respective reconstruction error; (c) provide an initial compressed encoding of the original data array which when uncompressed corresponds to a reference data array which is an initial approximation to the original data array, wherein the initial compressed encoding has a first data size and a first reconstruction error, representing a quantitative difference between the original data array and the reference data array; (d) select that one of the plurality of compressed encodings which, when uncompressed and added to the reference data array, provides the largest relative improvement in reconstruction error per unit increase in data size; (e) update the initial compressed encoding of the original data array by adding the selected compressed encoding, and updating the reference data array by adding the selected encoding in uncompressed form; and (f) recursively repeat steps (d) and (e) until a maximum data size is achieved for the compressed encoding of the original data array.

According to yet another aspect of the present invention there is provided a non-transitory computer readable storage medium having a computer program stored thereon, the computer program comprising processor readable instructions that, when executed, direct a device to perform actions comprising: (a) providing an original data array to be compressed; (b) determining a plurality of possible compressed encodings of the array, wherein each possible compressed encoding has a respective data size and a respective reconstruction error; (c) initialising a compressed encoding of the original data array which when uncompressed corresponds to a reference data array which is an initial approximation to the original data array, wherein the compressed encoding has a first data size and a first reconstruction error, representing a quantitative difference between the original data array and the reference data array; (d) selecting that one of the plurality of compressed encodings which, when uncompressed and added to the reference data array, provides the largest relative improvement in reconstruction error per unit increase in data size; (e) updating the compressed encoding of the original data array by adding the selected compressed encoding, and updating the reference data array by adding the selected encoding in uncompressed form; and (f) recursively repeating steps (d) and (e) until a maximum data size is achieved for the compressed encoding of the original data array.

According to another aspect of the invention there is provided a method of compressing an array of data entries in the form of digital electronic signals, the method comprising the steps of:
(a) providing an original data array to be compressed;
(b) dividing the original data array into blocks of one or more sizes;
(c) determining a plurality of possible compressed encodings for each block of the array using a respective different compression technique for each encoding of the block, wherein each possible compressed encoding has a respective data size and a respective reconstruction error;
(d) initialising a compressed encoding of the original data array which when uncompressed corresponds to a reference data array which is an initial approximation to the original data array, wherein the compressed encoding has a first data size and a first reconstruction error, representing a quantitative difference between the original data array and the reference data array;
(e) generating a list of the plurality of compressed encodings and selecting that one of the plurality of compressed encodings from the list which, when uncompressed and added to the reference data array, provides the largest relative improvement in reconstruction error per unit increase in data size;
(f) updating the compressed encoding of the original data array by adding the selected compressed encoding, and updating the reference data array by adding the selected encoding in uncompressed form; and
(g) recursively repeating steps (e) and (f) until a maximum data size is achieved for the compressed encoding of the original data array.

The step of generating the list of the plurality of compressed encodings may comprise the step of ranking the possible encodings for each block in terms of increasing data size and excluding from the list any of the possible compressed encodings for any given block which fail to yield a decrease in reconstruction error for that block for an increase in data size.

The step of selecting one of the plurality of compressed encodings may comprise selecting a second encoding in respect of a block for which a first encoding has previously been selected in an earlier iteration.

The step of updating the compressed encoding may comprise using the second encoding in addition to the first encoding.

The step of updating the compressed encoding may comprise using the second encoding in place of the first encoding.

The original data array may be divided first into a plurality of macroblocks and then into blocks within each macroblock.

The list of the plurality of compressed encodings may includes encodings for blocks in each macroblock as well as for each whole macroblock.

The step of generating a list of the plurality of compressed encodings may comprise determining a plurality of macroblocks compressed encodings for each macroblock, each macroblock encoding comprising a set of compressed encoding for blocks in the respective macroblock and the step of selecting one of the plurality of impressed encodings comprises selecting one of the macroblock compressed encodings.

According to another aspect of the invention there is provided a video encoder configured to send video data over a channel, the encoder comprising: a compressor configured to compress video data using an adjustable compression factor, and a transmitter configured to transmit constructed data packets over the channel, wherein the compressor is configured to:
(a) receive an original data array to be compressed;
(b) divide the original data array into blocks of one or more sizes;
(c) determine a plurality of possible compressed encodings for each block of the array using a respective different compression technique for each encoding of the block, wherein each possible compressed encoding has a respective data size and a respective reconstruction error;
(d) initialise a compressed encoding of the original data array which when uncompressed corresponds to a reference data array which is an initial approximation to the original data array, wherein the compressed encoding has a first data size and a first reconstruction error, representing a quantitative difference between the original data array and the reference data array;
(e) generate a list of the plurality for compressed encodings and select that one of the plurality of compressed encodings from the list which, when uncompressed and added to the reference data array, provides the largest relative improvement in reconstruction error per unit increase in data size;
(f) update the compressed encoding of the original data array by adding the selected compressed encoding, and updating the reference data array by adding the selected encoding in uncompressed form; and
(g) recursively repeat steps (e) and (f) until a maximum data size is achieved for the compressed encoding of the original data array.

According to another aspect there is provided a non-transitory computer readable storage medium having a computer program stored thereon, the computer program comprising processor readable instructions that, when executed, direct a device to perform actions comprising:
(a) providing an original data array to be compressed;
(b) dividing the original data array into blocks of one or more sizes;
(c) determining a plurality of possible compressed encodings for each block of the array using a respective different compression technique for each encoding of the block, wherein each possible compressed encoding has a respective data size and a respective reconstruction error;
(d) initialising a compressed encoding of the original data array which when uncompressed corresponds to a reference data array which is an initial approximation to the original data array, wherein the compressed encoding has a first data size and a first reconstruction error, representing a quantitative difference between the original data array and the reference data array;
(e) generating a list of the plurality of compressed encodings and selecting that one of the plurality of compressed encodings from the list which, when uncompressed and added to the reference data array, provides the largest relative improvement in reconstruction error per unit increase in data size;
(f) updating the compressed encoding of the original data array by adding the selected compressed encoding, and updating the reference data array by adding the selected encoding in uncompressed form; and
(g) recursively repeating steps (e) and (f) until a maximum data size is achieved for the compressed encoding of the original data array.

Method features may be provided as corresponding apparatus features and vice-versa.

Note that in general each of the optional features following each of the aspects of the invention above is equally applicable as an optional feature in respect of each of the other aspects of the invention and could be re-written after each aspect with any necessary changes in wording. Not all such optional features are re-written after each aspect merely in the interests of brevity.

Embodiments of the present invention will now be described, by way of example only, with reference to the accompanying drawings in which.

Figure 1:
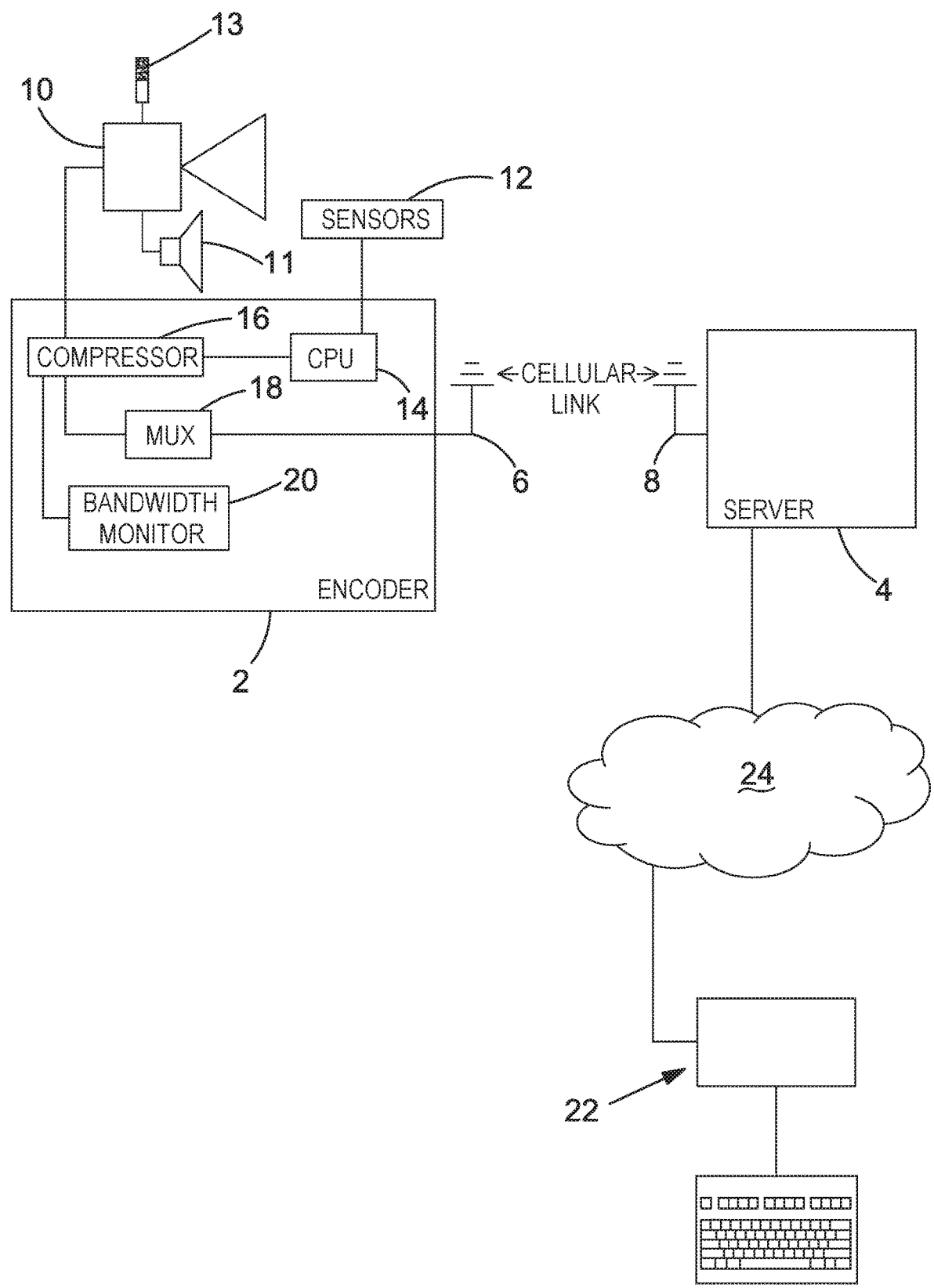
FIG. 1 is a schematic view of a transmission system in an embodiment of the present invention.

FIG. 1 is a schematic view of a transmission system including a video encoder 2 and a server 4 with respective cellular transceivers 6, 8. The encoder 2 is operable to send video data, time-critical data and non-time critical data to the server 4 over the cellular link. The server 4 is operable to send time-critical data and non-time critical data to the encoder 2 over the cellular link.

The server 4 is connected to user devices 22 over a conventional network 24, such as the internet. A number of alternative connections may be used between the server 4 and the user devices 22, including low bandwidth channels. The server 4 is configured to relay video and/or other data received from the encoder 2 to user devices 22 over the internet. In general a higher capacity connection is provided between the server 4 and user devices 22 than is possible in the cellular link between the server 4 and the encoder 2.

The video camera 10 is configured to capture video from a scene and provide it to a compressor 16 in the encoder 2. The compressor 16 is operable to compress video frames using an adjustable compression factor in order to produce compressed video frames with a predetermined data size. A multiplexer 18 receives compressed video from the video compressor 16 and also receives time-critical and non-time critical data from the CPU 14. These data are multiplexed into a single channel and transmitted to the server 4 over the cellular link. The compressor 16 may be implemented as dedicated hardware or as a computer program running on a processor.

The encoder includes a bandwidth monitor 20 which is configured to monitor the behaviour of data packets that have been transmitted in the channel. The bandwidth monitor 20 is also operable to instruct the video compressor 16 to change the adjustable compression factor in response to changing conditions in the channel. Techniques for calculating the adjustable compression factor are described in co-pending patent application no. GB1502434.2. For each video frame an adjustable compression factor is calculated so that the compressed representation of the video frame has a predictable data size.

In operation, the compressor 16 receives an uncompressed video frame from the camera 10. The compressor 16 partitions the received frame into a plurality of macro blocks, which are used as the base unit for coding. The video frame is partitioned into non-overlapping macro blocks where each macro block codes a unique array of pixel elements. The macro blocks may be any size and shape, but are typically square.

Generally, the reconstruction error that can be achieved decreases as the size of the macro blocks is decreased. However, the data size of the compressed representation of the video frame is generally increased as macro blocks decrease in size. If macro blocks were the only level of division in the frame then there would be a trade-off between the chosen size of the macro block, the data size of the compressed representation, and the resultant video quality or reconstruction error. For this reason macro block partitioning is used to support a trade-off between high compression and reconstruction quality that can be matched to the complexity of the pixel detail represented by each macro block.

Figure 2:
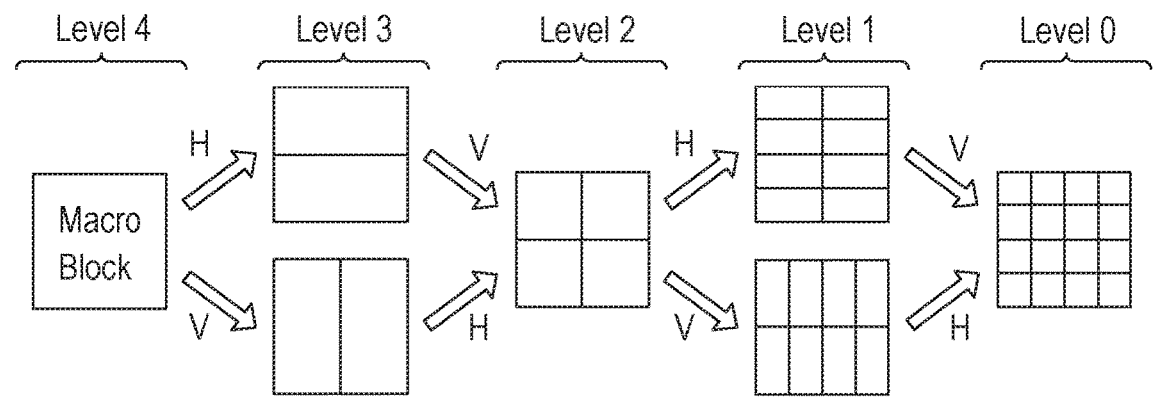
FIG. 2 is a diagram showing a possible hierarchical sub-division of a macro block in an embodiment of the present invention.

One example of macro block partitioning is shown in FIG. 2. In this example, level 4 represents the full size of the macro block. The other levels are created using successive horizontal or vertical division of the higher level blocks, and the level 0 blocks each provide for the approximation of $$\frac{N}{4} \times \frac{M}{4}$$

pixels from the original N×M pixel macro block. It should be noted that in this example there are four levels of division, but any number could potentially be used where fractional representation of pixels is viable.

Figure 3:
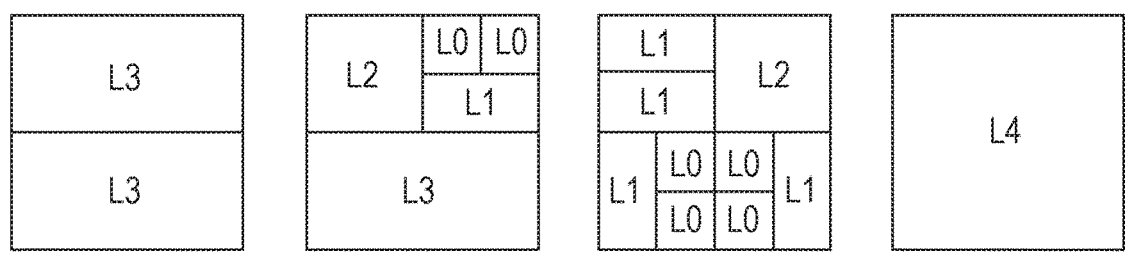
FIG. 3 is a diagram showing possible combinations of regions for use in the creation of a macro block coding.

The actual partitioning of each macro block used for video compression should normally be based on the complexity of the pixel detail being approximated where a compressed encoding of any combination of blocks can be used to represent the underlying pixels. FIG. 3 shows four examples of valid macro block partitioning. In each of these examples, a compressed encoding is calculated for each of the partitioned blocks, and these are added together to create a macro block coding (MBC) which is a compressed representation for the macro block. A good compression algorithm uses larger blocks for areas with simpler pixel detail (low frequency surfaces) and small blocks for areas representing highly complex pixel detail (high frequency edges or texture).

A macro block coding (MBC) provides a compressed representation of the original source pixels, with contributions from a number of possible partitions within the macro block. The quality of the approximation of the MBC to the original source pixels is quantified by the reconstruction error which is based on the sum of the difference between the source pixels and the equivalent pixel approximation of the uncompressed MBC.

A common reconstruction error metric used for video compression is sum of absolute differences (SAD) which is calculated as;

$$SAD = \left( \sum_{i=1}^{N} \sum_{j=1}^{M} |s(i, j) - A(i, j)| \right) \Leftrightarrow \sum_{i=1}^{N} \sum_{j=1}^{M} \sqrt{(s(i, j) - A(i, j))^2}$$

Where S(i,j) is the source pixel value at offset i,j within the macro block, and A(i,j) is the reconstructed pixel value at offset i,j based on applying the MBC of pixel size N×M.

Video compression that employs macro block partitioning has the challenge of determining an optimal partitioning as a trade-off between compression ratio and reconstruction quality based on sub-block size. This challenge is compounded when multiple techniques are available to approximate the source pixels represented by each sub-block.

The scale of the challenge can be appreciated when we consider the number of possible macro block coding permutations. For the macro block partitioning detailed in FIG. 2 there are T distinct block coding techniques that can be used to approximate the pixels represented by each of the macro block sub-blocks. Three examples of coding techniques include motion compensation, transform coding and spatial vector quantisation, although many others would naturally occur to a person skilled in the art of video compression.

At level 0, each block has T possible codings where each will offer a different reconstruction error for a given bit cost.

At level 1 we have the option of T possible codings for each vertical or horizontal block plus the option to sub-divide each block into two level 0 blocks where each has T possible codings. This gives us $T+T^2$ coding permutations for each level 1 block.

At level 2 we have the option of T possible codings for each level 2 block, or the option to sub-divide each level 2 block into two horizontal or two vertical level 1 blocks where these level 1 blocks can again be sub-divided into level 0 blocks. This gives us $T+2T^2+4T^3+T^4$ coding permutations for each level 2 block.

Following this logic, the total number of unique coding permutations for the full macro block illustrated in FIG. 2 with T distinct block coding techniques is;

$$T+2T^2+4T(T+2T^2+4T^3+T^4)+(T+2T^2+4T^3+T^4)^4$$

For T=4, there are approximately $9 \times 10^{10}$ unique coding permutations. In the present method the objective is to determine at least some of these $9 \times 10^{10}$ coding permutations, and to add these together in an iterative fashion until a specific data size is achieved for the video frame, according to the adjustable compression factor.

Figure 4:
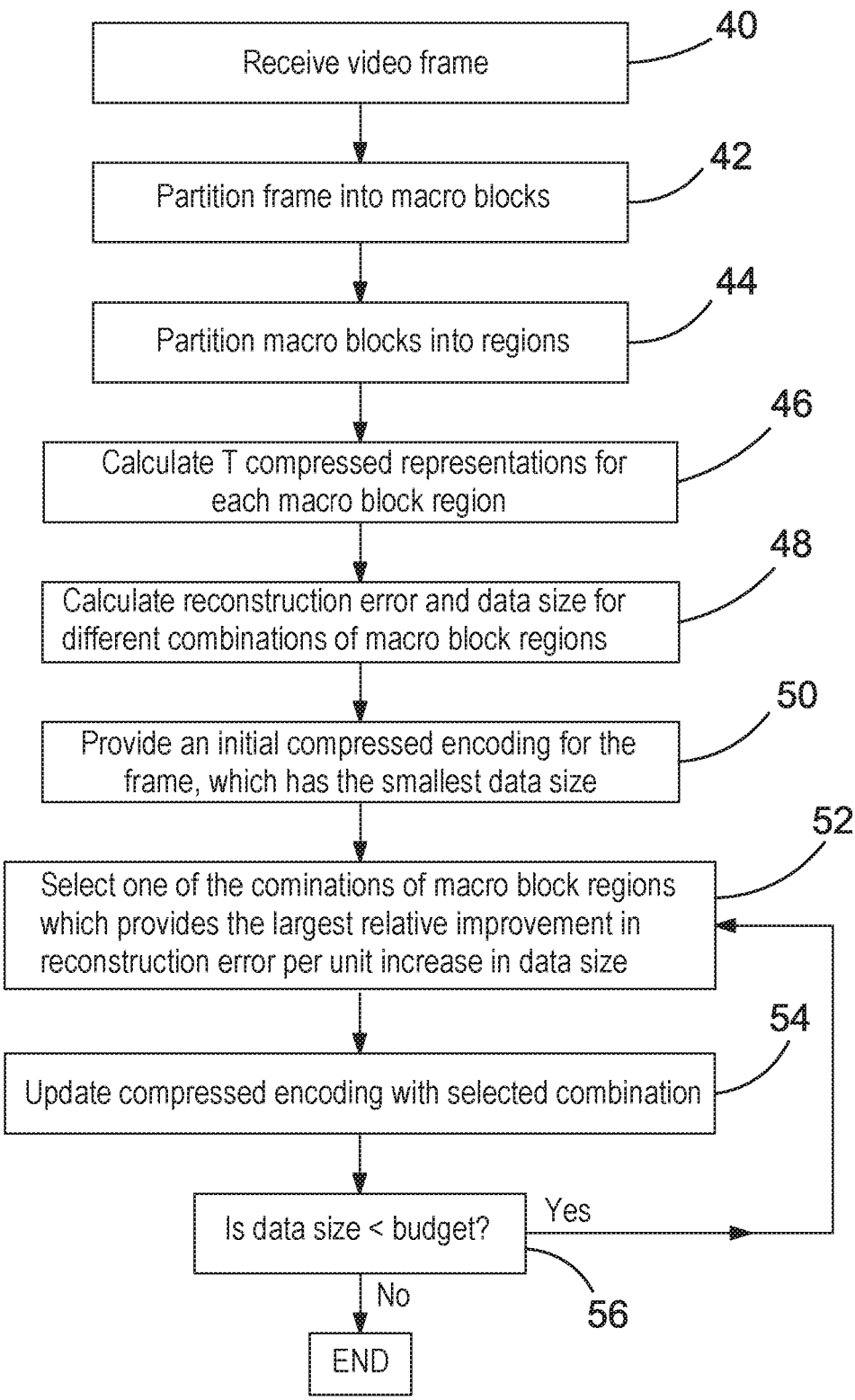
FIG. 4 is a flow diagram showing method steps for use in an embodiment of the present invention.

FIG. 4 is a flow chart illustrating the iterative technique that can be deployed for encoding a video frame. At step 40 the compressor 16 receives a video frame from the camera 10. At step 42 the video frame is partitioned into a plurality of macro blocks; typically around 1,000 macro blocks are created at step 42 for each frame. At step 44 each macro block is further partitioned into regions, as described above with reference to FIG. 2. In the example shown in FIG. 2, forty-one possible regions are created when a macro block is partitioned; this number is determined by adding all of the sub-divisions from level 0 to 3, plus the full macro block (level 4). At step 46 four compressed encodings are calculated for each of these forty-one regions, using four compression techniques or algorithms. The output from step 46 is 164 compressed encodings.

As discussed, these 164 compressed encodings can be combined in a very large number of ways. At step 48 the compressor 16 calculates the data size for a number of different permutations, together with the reconstruction error. These permutations can then be filtered and sorted to retain only those that can be ranked in terms of increasing data size and decreasing reconstruction error.

In practice, it may not be feasible to compute and sort all $9 \times 10^{10}$ coding permutations and also to provide real-time transmission of compressed data. Therefore, a number of techniques may be deployed for reducing the number of calculations at step 48, as will be discussed later.

At step 50 the compressor 16 determines an initial compressed encoding for the video frame. The initial compressed encoding comprises a compressed encoding for each macro block so that a compressed representation is determined for the whole frame. To provide an initial compressed encoding the selected encoding for each macro block is the one with the lowest data size, irrespective of its reconstruction error. This provides an initial compressed representation that has the smallest possible data size, but may offer a poor approximation to the original video frame when uncompressed.

At step 52 the compressor 16 selects one of the compressed encodings calculated at step 48, across all macro blocks in the frame, to be added to the initial compressed encoding. The selected compressed encoding is the one that offers the largest relative improvement in reconstruction error per unit increase in data size. It has been determined that this provides an efficient mechanism for improving reconstruction error, while balancing demands for a compressed encoding with a low data size.

The relative improvement per bit (RIPB) is calculated at step 52, as follows:

$$RIPB_n = \frac{r_{n-1} - r_n}{b_n - b_{n-1}}$$

Where: $r_n$ is the reconstruction error for the video frame, updated with a new compressed encoding, added to the initial compressed encoding; $r_{n-1}$ is the reconstruction error for the previous iteration of the compressed encoding (in the first iteration this will correspond to the reconstruction error for the initial compressed encoding); $b_n$ is the bit cost or data size when the new compressed encoding is added to the initial compressed encoding; $b_{n-1}$ is the bit cost for the previous iteration of the compressed encoding.

Thus, at step 52, RIPB is calculated for a plurality of possible encodings which could potentially be used to update the compressed representation of the video frame. One compressed encoding is selected at step 52, which is the compressed encoding that offers the highest RIPB.

At step 54 the initial compressed encoding is updated by adding the compressed encoding selected at step 52. This updated compressed encoding provides an improved reconstruction error for an increased data size.

At step 56 the compressor 16 analyses whether the data size of the updated compressed encoding is lower than the data budget associated with the adjustable compression factor. If the answer is 'yes', then it may still be possible to decrease the reconstruction error within the data budget. Therefore, steps 52 and 54 are repeated iteratively. In this way, the reconstruction error is gradually reduced and the data size of the compressed encoding is gradually increased by adding compressed encodings one-by-one that offer the largest relative improvement in reconstruction error per unit increase in data size. This iteration continues until the data size of the updated compressed encoding is equal to the data budget. In another arrangement the compressed encoding is not updated at step 54 if that update would increase the size of the compressed encoding beyond the budget. At this point the process ends and the output is a compressed representation of the video frame having a data size that is less than or equal to the data budget, as determined by the adjustable compression factor. The compressed representation of the video frame can then be combined with other data by the multiplexer 18 and transmitted to the server 4 over the variable bandwidth channel.

It should be noted that successive encodings selected during the iteration at step 52 may differ from one another only in the compression technique used to represent a sub-block. Thus, each block approximation technique can offer a way of further reducing reconstruction error at the expense of larger data size. This allows the process to start with the technique that gives a larger reconstruction error, but with a very low bit cost, and to replace it with an alternative block coding later in the compression process.

As discussed, it may not be feasible at step 48 to compute and sort all possible coding permutations for a video frame and also to provide real-time transmission of compressed data. This can be achieved in part by recognising that the list of possible coding permutations can be filtered so that it can be ordered in terms of increasing data size and decreasing reconstruction error. There is no advantage in calculating compressed encoding options if they cannot offer an improved reconstruction error in comparison to another encoding option that has a smaller data size.

In one example, the level 2 sub-division in FIG. 2 comprises four regions within a macro block. Each of these four regions can be encoded using four compression algorithms. Thus, there are 16 possible encodings for the underlying data, and 4 for each region. Each encoding has an associated data size and reconstruction error.

Thus, the four encodings for each region can be ranked in order of increasing data size. Encodings can then be omitted if any fail to yield a decrease in reconstruction error for an increase in data size. These encodings can be omitted because they would be redundant selections at step 52. These encodings would never be viable selections: they could not offer the largest RIPB because there exists an alternative encoding (produced with a different compression algorithm) that would yield a larger RIPB. By identifying and omitting such encodings it is possible to make a drastic reduction in the total number of permutations since any permutation including an omitted encoding is automatically excluded.

Additionally, for compression to be achieved the data size of the compressed representation must be smaller than the original array. Thus, an upper limit can be set for the cardinality of the set of coding permutations, which means that coding permutations can be omitted from further consideration.

Using these techniques it is possible to reduce the number of calculations at step 48 very significantly. As discussed, if four possible compression algorithms could be used together with 1,000 macro blocks sub-divided in the manner of FIG. 2 then there would be around $9 \times 10^{10}$ coding permutations to calculate at step 48. This number can be reduced to around 1,000 using the techniques described above.

Thus, it is possible to derive the best possible compressed encodings without having to derive all possible compressed encodings.

These techniques also support the compression of a video frame to a pre-determined number of bits. This allows for the compression of a sequence of video frames to a constant bit rate that is independent of the frame size and source frame content. This can enable low latency transmission of video over low bandwidth or variable bandwidth communication channels. This technique is therefore ideal for transmitting video frames with the optimal reconstruction error possible within specific bandwidth limits.

For a frame represented by a single macro block, compression to a target number of bits is achieved by first determining this optimal set of ordered MBCs and then extracting each MBC in turn until an entry is extracted that requires more bits to transmit than the target for the compression of the frame. The MBC used to approximate the macro block pixels in this instance would be the last MBC extracted from the ordered set that had a bit cost less than or equal to the frame bit cost target. For a frame represented by multiple macro blocks, an ordered set of sets is constructed such that the MBCs for all macro blocks are collectively ordered by relative improvement per bit and increasing bit cost. Compression of the video frame to a target number of bits is achieved by extracting MBCs from the ordered set of sets where we record the bit cost of the last entry extracted from each individual MBC set. The bit cost sum corresponds to the number of bits needed to transmit the last MBC extracted from each of the MBC sets and hence the cost of coding the video frame. Hence as with the single macro block example, the compression completes where the next best MBC extracted from the ordered set of sets has a bit cost that would result in a frame bit cost that exceeds the target frame bit cost.

This process provides for an optimal coding to a fixed number of bits, but is only viable if the process of ordering the set of MBC sets is computable in real time on practical processing hardware. Critical to this process is the use of a distinct set that provides for the ordering of the individual sets of macro block MBCs where this set of sets is reordered following the extraction of each MBC based on best RIPB. This gives a significant reduction in complexity as the MBCs for each macro block can be ordered in parallel.

The invention claimed is:

1. A method of compressing an array of data entries in the form of digital electronic signals, the method comprising the steps of:
   (a) providing an original data array to be compressed;
   (b) dividing the original data array into blocks of one or more sizes;
   (c) determining a plurality of possible compressed encodings for each block of the array using a respective different compression technique for each encoding of the block, wherein each possible compressed encoding has a respective data size and a respective reconstruction error;
   (d) initializing a compressed encoding of the original data array which when uncompressed corresponds to a reference data array which is an initial approximation to the original data array, wherein the compressed encoding has a first data size and a first reconstruction error, representing a quantitative difference between the original data array and the reference data array;
(e) generating a list of the plurality of compressed encodings and selecting that one of the plurality of compressed encodings from the list which, when uncompressed and added to the reference data array, provides the largest relative improvement in reconstruction error per unit increase in data size;
(f) updating the compressed encoding of the original data array by adding the selected compressed encoding, and updating the reference data array by adding the selected encoding in uncompressed form; and
(g) recursively repeating steps (e) and (f) until a maximum data size is achieved for the compressed encoding of the original data array.

2. The method of claim 1 wherein the step of selecting one of the plurality of compressed encodings comprises selecting a second encoding in respect of a block for which a first encoding has previously been selected in an earlier iteration.

3. The method of claim 2 in which the step of updating the compressed encoding comprises using the second encoding in addition to the first encoding.

4. The method of claim 2 in which the step of updating the compressed encoding comprises using the second encoding in place of the first encoding.

5. The method of claim 1 wherein the list of the plurality of possible compressed encodings comprises only those compressed encodings that can be provided in a sequence which has both increasing data size and decreasing reconstruction error.

6. The method of claim 1 wherein the step of generating the list of the plurality of compressed encodings comprises the step of ranking the possible encodings for each block in terms of increasing data size and excluding from the list any of the possible compressed encodings for any given block which fail to yield a decrease in reconstruction error for that block for an increase in data size.

7. The method of claim 1 comprising a step of de-duplicating the list of the plurality of possible compressed encodings to identify compressed encodings that have the same data size, and to omit any of those identified compressed encodings that have a larger reconstruction error.

8. The method of claim 1 wherein the list of the plurality of possible compressed encodings comprises only those compressed encodings that can be provided in a list having a data size that is smaller than the data size of the original array.

9. The method of claim 1 in which the original data array is divided first into a plurality of macroblocks and then into blocks within each macroblock.

10. The method of claim 9 in which the list of the plurality of compressed encodings includes encodings for blocks in each macroblock as well as for each whole macroblock.

11. The method of claim 9 in which the step of generating a list of the plurality of compressed encodings comprises determining a plurality of macroblocks compressed encodings for each macroblock, each macroblock encoding comprising a set of compressed encoding for blocks in the respective macroblock and the step of selecting one of the plurality of impressed encodings comprises selecting one of the macroblock compressed encodings.

12. The method of claim 1 wherein the array of data entries is part of a video stream.

13. The method of claim 1 further comprising the step of transmitting the compressed encoding over a variable bandwidth channel once the maximum data size has been achieved.

14. A video encoder configured to send video data over a channel, the encoder comprising: a compressor configured to compress video data using an adjustable compression factor, and a transmitter configured to transmit constructed data packets over the channel, wherein the compressor is configured to:
(a) receive an original data array to be compressed;
(b) divide the original data array into blocks of one or more sizes;
(c) determine a plurality of possible compressed encodings for each block of the array using a respective different compression technique for each encoding of the block, wherein each possible compressed encoding has a respective data size and a respective reconstruction error;
(d) initialize a compressed encoding of the original data array which when uncompressed corresponds to a reference data array which is an initial approximation to the original data array, wherein the compressed encoding has a first data size and a first reconstruction error, representing a quantitative difference between the original data array and the reference data array;
(e) generate a list of the plurality for compressed encodings and select that one of the plurality of compressed encodings from the list which, when uncompressed and added to the reference data array, provides the largest relative improvement in reconstruction error per unit increase in data size;
(f) update the compressed encoding of the original data array by adding the selected compressed encoding, and updating the reference data array by adding the selected encoding in uncompressed form; and
(g) recursively repeat steps (e) and (f) until a maximum data size is achieved for the compressed encoding of the original data array.

15. A non-transitory computer readable storage medium having a computer program stored thereon, the computer program comprising processor readable instructions that, when executed, direct a device to perform actions comprising:
(a) providing an original data array to be compressed;
(b) dividing the original data array into blocks of one or more sizes;
(c) determining a plurality of possible compressed encodings for each block of the array using a respective different compression technique for each encoding of the block, wherein each possible compressed encoding has a respective data size and a respective reconstruction error;
(d) initializing a compressed encoding of the original data array which when uncompressed corresponds to a reference data array which is an initial approximation to the original data array, wherein the compressed encoding has a first data size and a first reconstruction error, representing a quantitative difference between the original data array and the reference data array;
(e) generating a list of the plurality of compressed encodings and selecting that one of the plurality of compressed encodings from the list which, when uncompressed and added to the reference data array, provides the largest relative improvement in reconstruction error per unit increase in data size;
(f) updating the compressed encoding of the original data array by adding the selected compressed encoding, and updating the reference data array by adding the selected encoding in uncompressed form; and (g) recursively repeating steps (e) and (f) until a maximum data size is achieved for the compressed encoding of the original data array.

\* \* \* \* \*